April 22, 1958 W. A. V. THOMSEN 2,831,498
DIRECTION VALVE
Filed March 17, 1955

INVENTOR
William A. V. Thomsen
BY
ATTORNEY

United States Patent Office 2,831,498
Patented Apr. 22, 1958

2,831,498

DIRECTION VALVE

William A. V. Thomsen, Glen Ridge, N. J., assignor to Specialties Development Corporation, Belleville, N. J., a corporation of New Jersey Application March 17, 1955, Serial No. 494,833

7 Claims. (Cl. 137—455)

This invention relates to improvements in valves and, more particularly, to the type of valves generally known as direction valves for discharging fluid medium under pressure to a preselected point of use.

The valve of the present invention is particularly adapted to be utilized in connection with fire extinguishing systems for aircraft, which systems comprise a source of fire extinguishing medium under pressure, and a plurality of distribution conduits, controlled by direction valves, for conducting the medium to preselected points of use where a fire hazard may exist.

Heretofore, such valves have been devised in which a solenoid, or other electrical apparatus, has been employed to provide all the work necessary to initiate and complete the valving operation. Valves of this type have been found objectionable because relatively large and heavy solenoids were required and considerable electrical energy was consumed to effect their operation. Then too, since such valves were actuated by means which simultaneously effected release of the pressure medium, it was found that the pressure medium sometimes reached the valve before the solenoid, or other electrical apparatus, had completed the valving operation, wherefore, some of the pressure medium was directed to a point other than that selected.

Accordingly, an object of the present invention is to provide a direction valve which overcomes the foregoing difficulties and disadvantages.

Another object is to provide such a valve in which the solenoid, or other electrical apparatus, is used merely to select the direction in which the valve will discharge the pressurized medium.

Another object is to provide such a valve in which a portion of the energy of the pressurized fluid medium is used to effect the entire valving operation.

Another object is to provide such a valve wherein the selection mechanism may be a small, rapid acting, device having a low current consumption.

A further object is to provide such a valve which is self-resetting, regardless of the direction of discharge.

A still further object is to provide such a valve which is simple but rugged in construction, economical to manufacture and efficient and reliable in operation.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are accomplished by providing a valve for controlling the flow of a fluid pressure medium comprising, a body having a valve chamber formed with an inlet port and with a pair of outlet ports, a first valve member mounted in the chamber for closing one of the outlet ports, a second valve member mounted in the chamber for closing the other of the outlet ports, a link connected to each of the valve members for shifting the same to simultaneously effect closing of one of the outlet ports and opening of the other of the outlet ports, pressure responsive means adapted to move in a direction towards the chamber under the influence of pressure medium entering the inlet port, actuating means movably mounted on the pressure responsive means for engaging the link, stop means adjacent the link engageable by the actuating means to render the latter effective to shift the link from one position to another upon movement of the pressure responsive means, and means for withdrawing the stop means to render the actuating means ineffective to shift the link.

A preferred embodiment of the invention has been chosen for purposes of illustration and description, and is shown in the accompanying drawing, forming a part of the specification, wherein.

Figure 1:
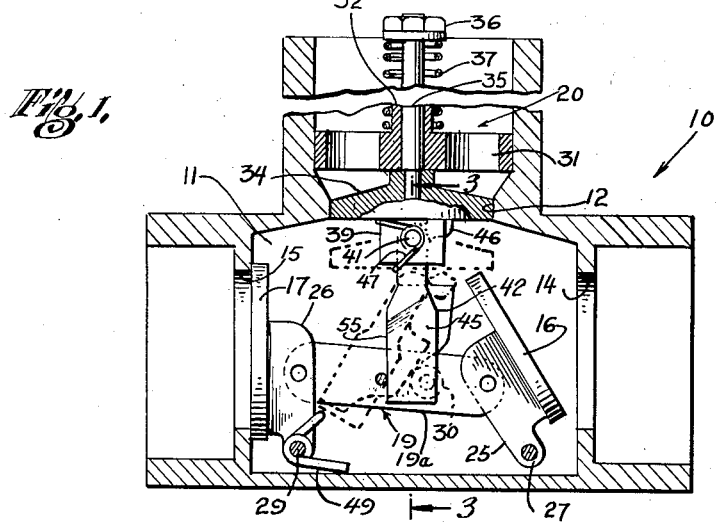
Fig. 1 is a schematic vertical sectional view taken axially through a valve embodying the present invention showing the same, in full lines, in its normal position and showing, in broken lines, the position of the pressure responsive means and the valve actuating means when discharge is taking place through one of the outlet ports.
Figure 2:
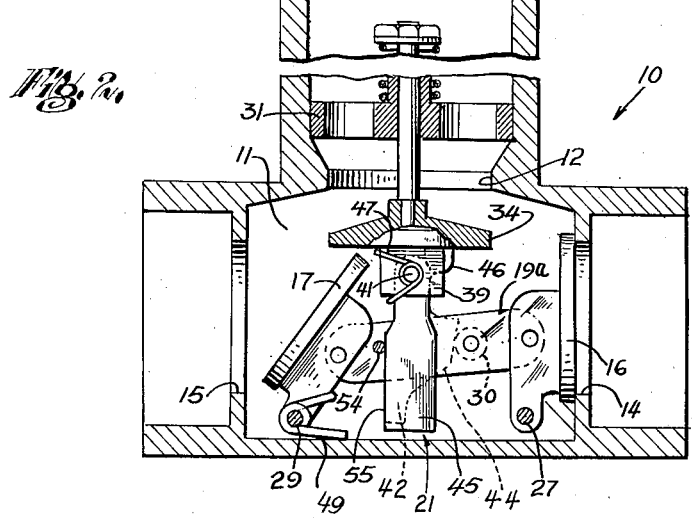
Fig. 2 is a view similar to Fig. 1 showing the various elements in their respective positions as discharge occurs through the other outlet port.

Referring to Figs. 1 and 2 of the drawing, there is shown a valve body 10 formed with a chamber 11, an inlet port 12, a pair of outlet ports 14 and 15, a pair of valve members 16 and 17 for the ports 14 and 15, respectively, a link 19 connected to the valve members 16 and 17, piston means 20 mounted in the inlet port 12, and a cam member 21 depending from the piston means into the chamber 11.

In the illustrated embodiment of the invention, the outlet ports 14 and 15 are circular openings having flat side surfaces disposed at opposite sides of the chamber 11 and the inlet port 12 is intermediate the outlet ports.

The flow of fluid medium through the valve is controlled by the valve members 16 and 17 which are disc-shaped elements adapted to engage the side surfaces of the outlet ports 14 and 15, respectively, to close the same. The valve members 16 and 17 are provided with a pair of spaced, parallel generally L-shaped legs 25 and 26, respectively, extending inwardly and downwardly of the valve members, as viewed, to the bottom of the chamber 11 where each of the pairs of legs is pivotally mounted on one of two transversely disposed shafts 27 and 29, respectively.

The link 19 comprises a pair of parallel, elongate, rigid members 19a and 19b (Fig. 3) each of which is pivotally secured at one of its ends to one of the legs 25 and 26 of the valve members 16 and 17 at a point slightly below the central axis of the outlet ports. The link 19 is of such length as to maintain one of the valve members disengaged from its respective outlet port while the other valve member is in outlet port closing position. A cylindrical roller 30 is rotatably mounted between the link members 19a and 19b off-center with respect to the link in a direction towards the outlet port 14 and with its axis of rotation prependicular to the longitudinal axis of the link 19.

The piston means 20 includes a spider 31 which is threaded into the valve body 10 adjacently exterior of the inlet port 12 and is formed with a central tubular sleeve portion 32 extending in a direction away from the chamber 11, and a plunger or piston 34 which is normally disposed adjacent the inlet port 12 and has a central stem 35 extending through and beyond the sleeve portion 32 for slideable engagement therewith. The end of the stem 35 opposite the plunger or piston 34 is threaded to receive a nut 36. This nut serves as an adjustable abutment for one end of a helical spring 37 which surrounds the sleeve portion 32 and bears, at its other end, against the spider 31 for normally maintaining the piston 34 out of the chamber 11. The lower face of the piston is provided with a pair of depending bearing blocks 39 for a purpose to be described hereinafter.

As illustrated in the drawing, the cam member 21 includes a head portion 40 abutting the face of the piston 34 and disposed between the bearing blocks 39. The cam member is pivotally mounted on a pin 41 which extends therethrough and is journalled in the blocks 39. A cam element 42 depends from the head portion 40 and extends between the link members 19a and 19b. As shown in Figs. 1 and 2, the edge of cam element facing the outlet port 14 is contoured to provide an inclined stepped cam surface 44 which extends generally downwardly and inwardly with respect to the outlet port 14 and is adapted to bear against the roller 30. The cam member is formed with a guide plate 45, which depends from one side of the head portion parallel to the cam element and adjacent the outer surface of the link member 19a, and with a stop 46 which extends towards the outlet 14 and normally abuts the surface of the piston 34. A conventional torsion spring 47, mounted at each end of the pin 41, bears against the piston surface and the edge of the cam member facing the outlet port 15 to maintain the same normally perpendicular to the face of the piston 34.

A spring 49 mounted under the shaft 29, bears against the bottom of the chamber 11 and against the valve member 17 to urge the same into port closing position. This spring is adapted to exert a greater spring force than the cam member spring 47 described hereinbefore.

Figure 3:
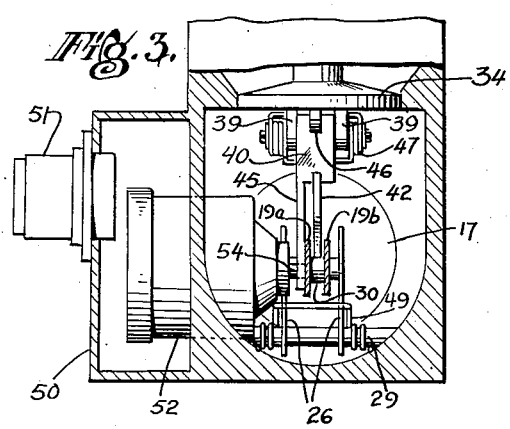
Fig. 3 is a fragmentary sectional view taken along the line 3—3 on Fig. 1, illustrating portions of the valve member operating mechanism.
Figure 4:
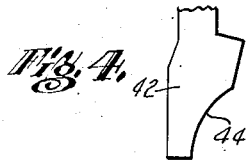
Fig. 4 is a fragmentary elevational view of a cam adapted to shift the valve linkage.

As illustrated in Fig. 3, one side wall of the valve body 10 serves to mount an exterior casing 50 provided with a conventional electrical connector 51. The casing 50 and the valve body 10 serve to mount a small, lightweight, conventional solenoid 52, the armature of which has a pin 54 disposed perpendicular to the longitudinal axis of the link 19 and extending to a point adjacent the front face of the link member 19a and at the edge 55 of the guide plate 45 facing the outlet port 15.

In operation, the present valve is adapted to direct fluid under pressure entering the chamber 11 from the inlet port 12 to a preselected point of use through either of the outlet ports 14 or 15.

In order to discharge fluid through the outlet port 14, the fluid medium under pressure is released from its container (not shown) and directed by suitable conduits to the inlet port. The solenoid 52 is simultaneously energized to withdraw the pin 54 (Fig. 3) from its position adjacent the edge 55 of the guide plate 45 facing the outlet port 15. The pressurized fluid medium passes the spider 31 adjacent the inlet port 12 and acts against the piston or plunger 34 driving the same into the chamber 11 against the force of the spring 37. As the piston moves downwardly, into the valve chamber, the inclined cam surface 44 is urged against the roller 30 and, since the spring 49, tending to maintain the valve members in the position illustrated in solid lines in Fig. 1, is stronger than the spring 47, tending to maintain the cam member 21 perpendicular to the piston face, the cam member is caused to pivot about the pin 41 until the various elements of the valve assume the respective positions illustrated in broken lines in Fig. 1, so that the inlet port and outlet port 14 are opened to permit the fluid medium to flow therethrough to the selected point of use.

When the pressure in the inlet port decreases sufficiently, the spring 37 is effective to return the piston to its normal position adjacent the inlet port 12 whereupon the torsion spring 47 causes the cam member 21 to return to its normal position perpendicular to the face of the piston, as shown in solid lines in Fig. 1, with the stop 46 abutting the piston face to assure proper alignment.

To direct the fluid medium through the outlet port 15, the fluid is released from its container and directed to the inlet port, as described heretofore, but the solenoid is not energized so that the pin 54 remains in its normal position adjacent the link member 19a and the edge of the guide plate 45 facing the outlet port 15. As the piston 34 moves into the chamber 11, the cam surface 44 engages the roller 30 causing the edge 55 of the guide plate 45 to engage the pin 54 which serves as a stop to prevent the cam member 21 from pivoting about the pin 41, whereupon the roller 30, urged by the cam surface 44, and the link 19 are shifted in a direction towards the outlet port 14. Such movement of the link 19 causes the valve member 16 and its respective bracket to pivot about the shaft 27 to close the outlet port 14, and at the same time, causes the valve member 17 and its respective bracket to pivot about the shaft 29 to unclose the outlet port 15 against the force of the spring 49. At this point, the various elements of the valve are in the respective positions shown in Fig. 2.

As the inlet pressure decreases, the spring 37 returns the piston and the cam member to their normal positions thereby permitting the link 19, the roller 30 and the valve members 16 and 17 to be returned to their normal positions under the influence of the spring 49.

From the foregoing description, it will be seen that the present invention provides a direction valve in which a portion of the energy of the pressurized fluid medium is used to effect the entire valving operation so that electrical apparatus need be used merely to select the direction in which the valve will discharge, thereby permitting the use of a small rapidly acting solenoid having a low current consumption. It will also be noted that the present valve is self-resetting, regardless of the direction of discharge, and is simple but rugged in construction, economical to manufacture and efficient and reliable in operation. It will further be noted that the solenoid need be maintained energized only when it is desired to discharge through one of the two outlet ports, and then only until the pressurized medium reaches the inlet port which, in most installations occurs in a fraction of a second.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. A valve for controlling the flow of a fluid pressure medium comprising, a body having a valve chamber formed with an inlet port and with a pair of outlet ports, a first valve member mounted in said chamber for closing one of said outlet ports, a second valve member mounted in said chamber for closing the other of said outlet ports, a link connected to each of said valve members for shifting the same to simultaneously effect closing of one of said outlet ports and opening of the other of said outlet ports, pressure responsive means adapted to move in a direction towards said chamber under the influence of pressure medium entering said inlet port, actuating means movably mounted on said pressure responsive means for engaging said link, stop means adjacent said link engageable by said actuating means to render the latter effective to shift said link from one position to another upon movement of said pressure responsive means, and means for withdrawing said stop means to render said actuating means ineffective to shift said link.

2. A valve for controlling the flow of a fluid pressure medium comprising, a body having a valve chamber formed with an inlet port and with a pair of outlet ports, a first valve member pivotally mounted in said chamber for closing one of said outlet ports, a second valve member pivotally mounted in said chamber for closing the other of said outlet ports, a link pivotally connected to each of said valve members for shifting the same to simultaneously effect closing of one of said outlet ports and opening of the other of said outlet ports, pressure responsive means adapted to move in a direction towards said chamber under the influence of pressure medium entering said inlet port, actuating means pivotally mounted on said pressure responsive means for engaging said link, stop means adjacent said link engageable by said actuating means to render the latter effective to shift said link from one position to another upon movement of said pressure responsive means, and means for withdrawing said stop means to render said actuating means ineffective to shift said link.

3. A valve for controlling the flow of a fluid pressure medium comprising, a body having a valve chamber formed with a pair of opposed outlet ports and with an intermediate inlet port, a first valve member mounted in said chamber for closing one of said outlet ports, a second valve member mounted in said chamber for closing the other of said outlet ports, a link pivotally connected to each of said valve members for shifting the same to simultaneously effect closing of one of said outlet ports and opening of the other of said outlet ports, pressure responsive means adapted to move in a direction towards said chamber under the influence of pressure medium entering said inlet port, actuating means movably mounted on said pressure responsive means for engaging said link, stop means adjacent said link engageable by said actuating means to render the latter effective to shift said link from one position to another upon movement of said pressure responsive means, and means for withdrawing said stop means to render said actuating means ineffective to shift said link.

4. A valve for controlling the flow of a fluid pressure medium comprising, a body having a valve chamber formed with an inlet port and with first and second outlet ports, a first valve member mounted in said chamber for normally closing said first outlet port, a second valve member mounted in said chamber for normally unclosing said second outlet port, a link pivotally connected to each of said valve members for shifting the same to simultaneously effect closing of said second outlet port and unclosing said first outlet port, pressure responsive means adapted to move in a direction towards said chamber under the influence of pressure medium entering said inlet port, actuating means movably mounted on said pressure responsive means for engaging said link, stop means adjacent said link engageable by said actuating means to render the latter effective to shift said link from one position to another upon movement of said pressure responsive means, and means for withdrawing said stop means to render said actuating means ineffective to shift said link.

5. A valve for controlling the flow of a fluid pressure medium comprising, a body having a valve chamber formed with an inlet port and with first and second outlet ports, a first valve member mounted in said chamber for normally closing said first outlet port, a second valve member mounted in said chamber for normally unclosing said second outlet port, a link pivotally connected to each of said valve members for shifting the same to simultaneously effect closing of said second outlet port and unclosing said first outlet port, pressure responsive means adapted to move in a direction towards said chamber under the influenec of pressure medium entering said inlet port, actuating means movably mounted on said pressure responsive means for engaging said link, stop means adjacent said link engageable by said actuating means to render the latter effective to shift said link from one position to another upon movement of said pressure responsive means, means for withdrawing said stop means to render said actuating means ineffective to shift said link, a return spring for said pressure responsive means, and a spring for urging said valve members into their normal positions.

6. A valve for controlling the flow of a fluid pressure medium comprising, a body having a valve chamber formed with an inlet port and with first and second outlet ports, a first valve member mounted in said chamber for normally closing said first outlet port, a second valve member mounted in said chamber for normally unclosing said second outlet port, a link pivotally connected to each of said valve members for shifting the same to simultaneously effect closing of said second outlet port and unclosing said first outlet port, pressure responsive means adapted to move in a direction towards said chamber under the influence of pressure medium entering said inlet port, actuating means movably mounted on said pressure responsive means for engaging said link, stop means adjacent said link engageable by said actuating means to render the latter effective to shift said link from one position to another upon movement of said pressure responsive means, means for withdrawing said stop means to permit deflection of said actuating means to render said actuating means ineffective to shift said link, a spring for returning said actuating means to its link shifting position adapted to yield when said stop means is withdrawn, and a spring for urging said valve members into their normal position adapted to exert a greater force than said first mentioned spring.

7. A valve for controlling the flow of a fluid pressure medium comprising, a body having a valve chamber formed with a pair of opposed outlet ports and an intermediate inlet port, a first valve member pivotally mounted in said chamber adjacent one of said outlet ports for normally closing the same, a second valve member pivotally mounted in said chamber adjacent one of said outlet ports for normally unclosing the same, a link pivotally connected to each of said valve members for shifting the same to simultaneously effect closing of said normally unclosed outlet port and unclosing of said normally closed outlet port, a roller mounted on said link between one end and the center thereof, piston means mounted in said inlet port adapted to move into said chamber between said outlet ports under the influence of pressure medium entering said inlet port, a cam member pivotally mounted on said piston means and depending into said chamber having a cam surface adapted to engage said roller, a pin adjacent said link engageable by said cam member to render said cam surface effective to bear against said roller to shift said link upon movement of the piston means, a solenoid for withdrawing said pin to permit deflection of the cam member and render the same ineffective to shift said link, a return spring adjacent said inlet port for said piston means, a spring for returning said cam member to its link shifting position adapted to yield when said pin is withdrawn, and a spring adjacent said first valve member for urging said valve members into their normal position adapted to exert a greater force than said last mentioned spring.

References Cited in the file of this patent

UNITED STATES PATENTS

| | | |
|---|---|---|
| 337,718 | Vangezell | Mar. 9, 1886 |
| 1,090,769 | Wescott | Mar. 17, 1914 |
| 2,311,844 | Lindsay | Feb. 23, 1943 |